(12) United States Patent
Christen et al.

(10) Patent No.: US 10,035,067 B2
(45) Date of Patent: Jul. 31, 2018

(54) MULTI-TOUCH SURFACE EXTENSION USING CONDUCTIVE TRACES AND PADS

(71) Applicant: Disney Enterprises, Inc., Burbank, CA (US)

(72) Inventors: Benjamin Christen, Los Angeles, CA (US); Quinn Smithwick, Pasadena, CA (US); Harout Jarchafjian, Glendale, CA (US); Jeffrey Voris, Los Angeles, CA (US); Jorge Alted, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 527 days.

(21) Appl. No.: 14/923,211

(22) Filed: Oct. 26, 2015

(65) Prior Publication Data

US 2016/0101359 A1 Apr. 14, 2016

Related U.S. Application Data

(63) Continuation of application No. 14/514,183, filed on Oct. 14, 2014, now Pat. No. 9,207,827.

(51) Int. Cl.
| | |
|---|---|
| *G06F 3/044* | (2006.01) |
| *A63F 13/55* | (2014.01) |
| *G06F 1/16* | (2006.01) |
| *A63F 13/2145* | (2014.01) |
| *A63F 3/00* | (2006.01) |

(52) U.S. Cl.
CPC .......... *A63F 13/55* (2014.09); *A63F 3/00643* (2013.01); *A63F 13/2145* (2014.09); *G06F 1/1605* (2013.01); *G06F 3/044* (2013.01); *A63F 2003/00662* (2013.01)

(58) Field of Classification Search
CPC .... G06F 3/0412; G06F 3/0416; G06F 3/0488; G06F 3/044
See application file for complete search history.

(56) References Cited

U.S. PATENT DOCUMENTS

| | | | | |
|---|---|---|---|---|
| 4,969,650 | A * | 11/1990 | Magara | A63F 3/00643 273/237 |
| 8,512,151 | B1 * | 8/2013 | Mkrtchyan | A63F 13/2145 273/237 |
| 2006/0175753 | A1 * | 8/2006 | MacIver | A63F 3/00643 273/237 |
| 2006/0183545 | A1 * | 8/2006 | Jourdian | A63F 7/06 463/36 |

(Continued)

*Primary Examiner* — Ricardo L Osorio
(74) *Attorney, Agent, or Firm* — Farjami & Farjami LLP

(57) ABSTRACT

There is provided an interactive board for use with a plurality of game pieces and a user device having a touch screen. The interactive board has a space for placing one of the plurality of game pieces thereon. The space includes a rotation code sense pad array connected to a first plurality of conductive traces connectable to the touch screen of the user device for identifying one of a plurality of rotation positions of the one of the plurality of game pieces placed in the space, by the user device, a ground for grounding the one of the plurality of game pieces placed in the space, and an identification code sense pad array connected to a second plurality of conductive traces connectable to the touch screen of the user device for identifying the one of the plurality of game pieces placed in the space, by the user device.

20 Claims, 11 Drawing Sheets

(56) References Cited

U.S. PATENT DOCUMENTS

| | | | |
|---|---|---|---|
| 2012/0212241 A1* | 8/2012 | Wallace | A63F 3/00643 324/686 |
| 2015/0068387 A1* | 3/2015 | Shi | G09B 15/023 84/471 R |
| 2015/0084650 A1* | 3/2015 | Zachut | A63F 3/00643 324/658 |

* cited by examiner

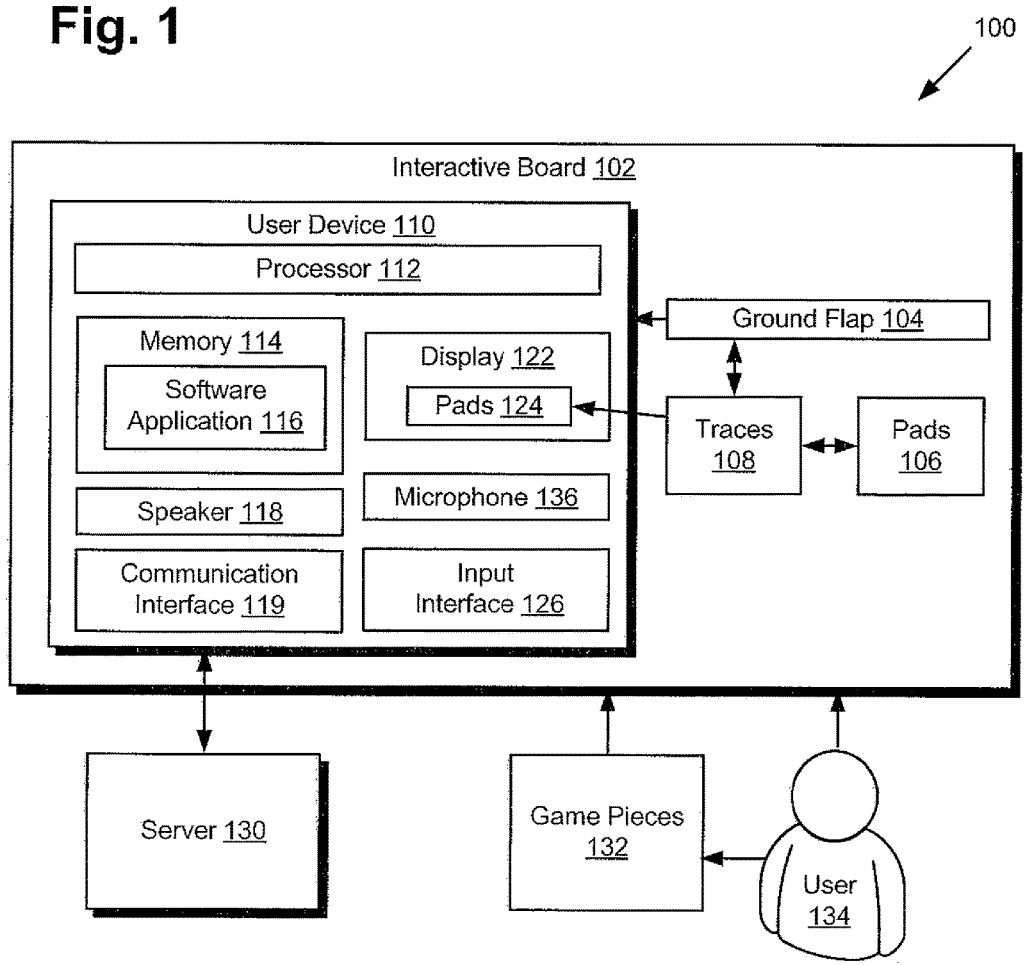

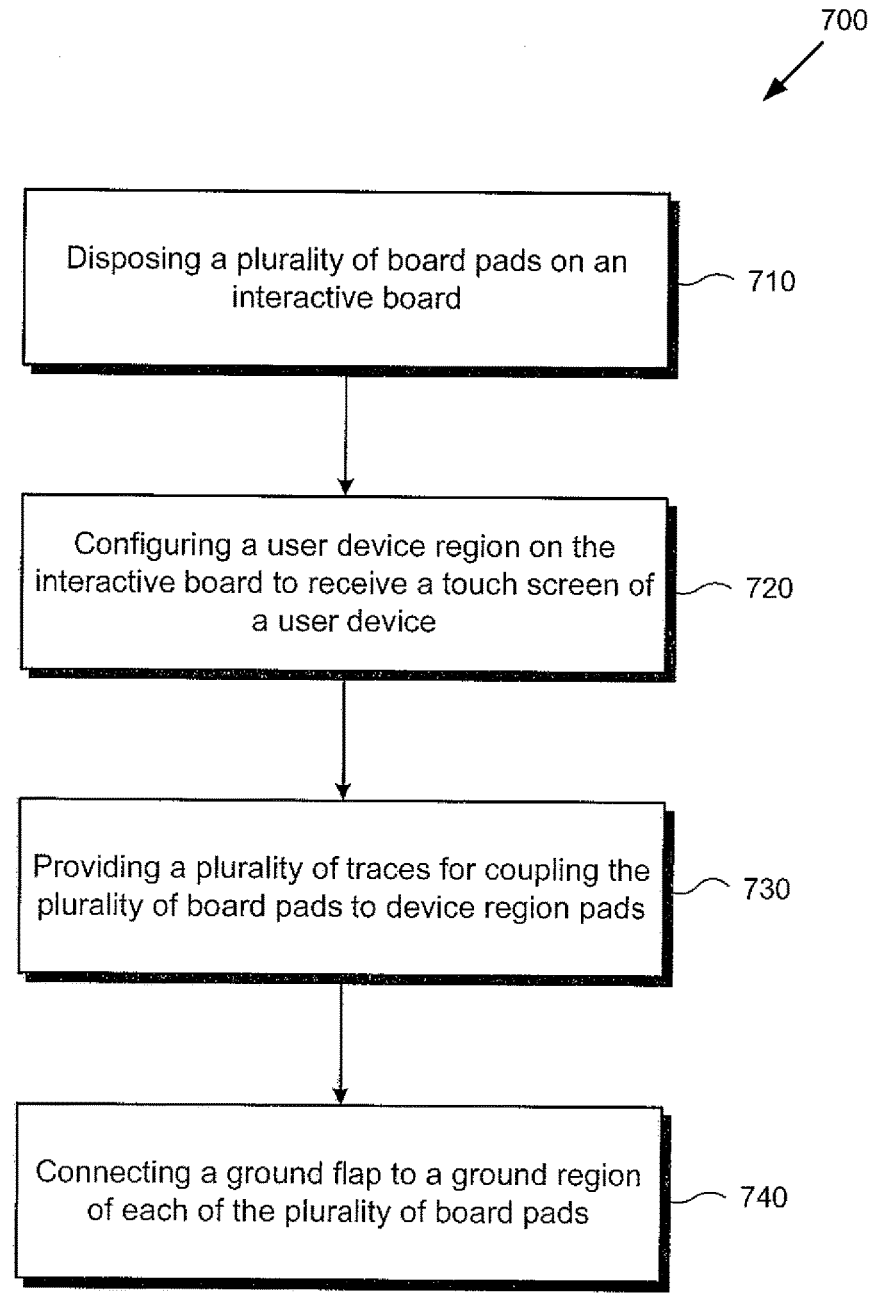

MULTI-TOUCH SURFACE EXTENSION USING CONDUCTIVE TRACES AND PADS

This application is a Continuation of U.S. application Ser. No. 14/514,183, filed Oct. 14, 2014, which is hereby incorporated by reference in its entirety.

BACKGROUND

Board games continue to serve as a source of entertainment for families, friends, and individuals. Over the years, board games have attempted to integrate electronics into game play. However, in order to offer the board games at prices that are attractive to consumers, the board games often have had limited electronic integration, and have included the electronics as part of the board game itself.

At the same time, touch screen devices have become increasingly prevalent in the marketplace, and people of all ages have come to enjoy game play experiences offered on touch screen devices. These touch screen devices offer a touch sensitive surface over a display and can detect the presence and position of touch input, opening up the possibility of new ways to interact with electronic devices.

However, most board game simulations on touch screen devices include the entire board game on the touch screen device as an electronic board game. For example, games like Monopoly® can be played entirely on touch screen devices. However, despite such advancements, there is still a strong market for more traditional board game experiences, yet there is a shortage of inexpensive, hybrid game play experiences, that capitalize on the traditional physical board game experience while integrating the electronic board game with touch screen devices.

SUMMARY

The present disclosure is directed to a multi-touch surface extension using conductive traces and pads, substantially as shown in and/or described in connection with at least one of the figures, as set forth more completely in the claims.

BRIEF DESCRIPTION OF THE DRAWINGS

FIG. 1 presents a system utilizing a multi-touch surface extension using conductive traces and pads, according to one implementation of the present disclosure.

FIG. 7 presents a flowchart illustrating a method for creating an interactive board for use with a user device having a touch screen, according to one implementation of the present disclosure.

DETAILED DESCRIPTION OF THE INVENTION

Figure 2A:
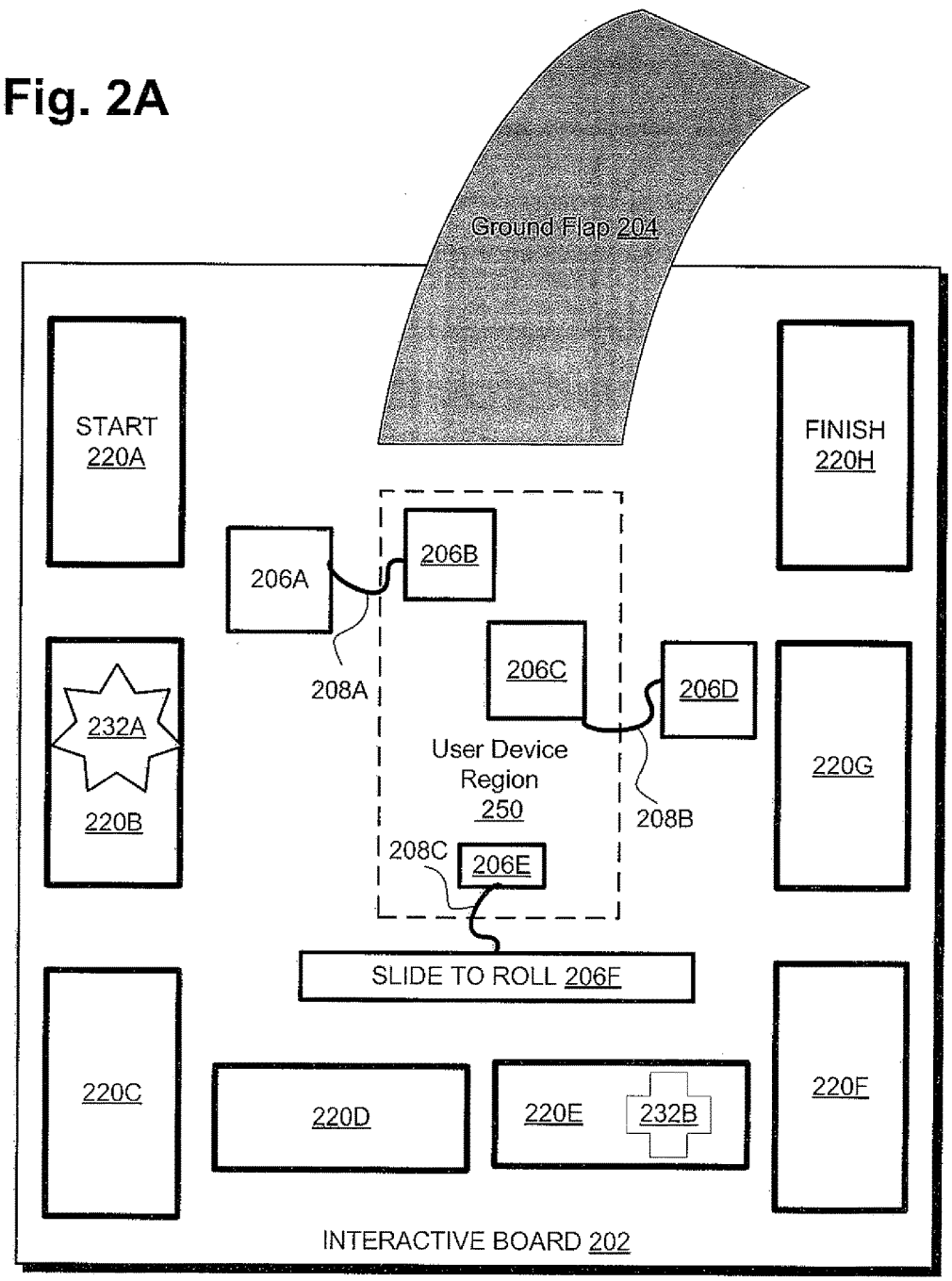
FIG. 2A presents an example of a top view of an interactive board, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system utilizing a multi-touch surface extension using conductive traces and pads, according to one implementation of the present disclosure. System 100 of FIG. 1 includes interactive board 102, user device 110, server 130, game pieces 132, and user 134. Interactive board 102 includes ground flap 104, pads 106, and traces 108. User device 110 includes processor 112, memory 114, speaker 118, microphone 136, communication interface 119, display 122, and input interface 126. Memory 114 includes software application 116. Display 122 includes pads 124.

Interactive board 102 may include a game board, a poster, a piece of paper, a placemat, or any suitable board capable of receiving conductive traces 108 and pads 106. In some implementations, interactive board 102 may be manufactured to include traces 108, pads 106, and ground flap 104. For example, user 134 may purchase interactive board 102 from a store. However, in other implementations, interactive board 102 may be created by user 134 to include traces 108, pads 106, and ground flap 104. For example, user 134 may create interactive board 102 using software application 116, or may create interactive board 102 separate from software application 116 and transmit the information to software application 116. In such an example, user 134 may be provided with a list of themes for a game that, once selected, allow user 134 to choose from a list of pre-designed game board layouts with associated games tailored to the selected theme. User 134 may then use the game board layouts to create interactive board 102 by placing each of traces 108 and pads 106 on interactive board 102 according to the game board layouts.

Traces 108 and pads 106 may include printed conductive ink, or any suitable conductive material that can be utilized to communicate an input from user 134 to user device 110. In one implementation, each of pads 106 may include a ground region and a sense region. In such an implementation, the ground region and the sense region may be interdigitated such that, for example, a single input from user 134 connects with both the ground region and the sense region of pads 106. For example, single input from user 134 may be recognized by pads 106 using the ground region and the sense region.

Traces 108 are utilized by interactive board 102 to communicate the input from user 134 to user device 110. In one implementation, each of traces 108 may include at least one ground trace and at least one sense trace. In such an implementation, inputs to the sense regions of pads 106 are carried along the sense traces of traces 108 to pads 124 of display 122 on user device 110. Furthermore, inputs to the ground regions of pads 106 are carried along the ground graces of traces 108 to ground flap 104.

Ground flap 104 may include any device or material that is capable of grounding user device 110 with respect to interactive board 102. In one implementation, ground flap 104 may include a foil (or other conductive material) flap that is at least partially connected to interactive board 102, and at least partially covers a back area of user device 110. For example, a cell phone utilizing a capacitive touch screen requires a ground on the back of the phone, e.g., a palm of a user's hand, and also requires a touch on the screen, e.g., a user's finger, to recognize a touch input. As such, ground flap 104 may serve as the ground on the back of user device 110, or the palm of the hand, and pads 106 and traces 108 connected to pads 124 on display 122 of user device 110 may serve as the touch on display 122, such as the finger, to allow user device 110 to recognize the user input to interactive board 102. User device 110 is able to recognize and measure a relative capacitance between the front area and the back area of user device 110 when an input is received due to a capacitive coupling created by ground flap 104 and pads 124 on display 122.

It should be noted that in one implementation, user device 110 may be facing upwards on interactive board 102, such that display 122 is facing user 134. In such an implementation, pads 124 may include a transparent material, such as a transparent conductive plastic. In one implementation, traces 108 may be formed as individual flaps or bridges to cover pads 124 on display 122 of user device 110. In such an implementation, the individual flaps or bridges of traces 108 are connected to pads 106 to transmit signals from pads 106 to pads 124 on display 122 of user device 110. Portions of pads 106 are connected to ground flap 104, or plane, under device 110. The transparent material allows user 134 to view display 122 of user device 110 during use of interactive board 102. The ground traces of traces 108 are in connection with a grounding feature of interactive board 102, such as a metal layer on interactive board 102 where user device 110 is placed.

As illustrated in FIG. 1, system 100 includes game pieces 132. Game pieces 132 may include any object that can be utilized by user 134 when using interactive board 102. For example, game pieces 132 may include, but are not limited to, dice, toy figures, cards, or chips. In one implementation, game pieces 132 include ground and sense regions that correspond to the ground and sense regions of spaces on interactive board 102. In such an implementation, when game pieces 132 come into contact with the spaces on interactive board 102, the arrangement of the ground and sense regions on game pieces 132 and the arrangement of the ground and sense region on the spaces of interactive board 102 may allow for user device 110 to recognize an identification, orientation, rotation, and/or location of game pieces 132 on interactive board 102.

Also illustrated in FIG. 1, system 100 includes server 130 including a processor (not shown) and a memory (not shown). Server 130 may be accessible over any suitable communications network, including a local area network. Server 130 may be an application server, or server 130 may be any server capable of communicating with user device 110 over a network through communication interface 119. In some implementations, server 130 may be configured to provide software application 116 and/or transfer software application 116 for storage in memory 114 of user device 110 over the network using communication interface 119. Furthermore, server 130 may provide updates or changes to software application 116 after software application 116 is stored in memory 114. Updates or changes may occur randomly, on a predetermined schedule, and/or when updates are requested by user device 110. In other implementations, software application 116 may not be stored in memory 114, and instead processor 112 may execute software application 116 on user device 110 dynamically over the network.

Also illustrated in FIG. 1, system 100 includes user device 110. User device 110 may include a mobile phone, tablet, personal computer, or any other capacitance multi-touch device capable of executing software application 116. As shown in FIG. 1, user device 110 includes a display 122 and input interface 126. Display 122 may comprise a liquid crystal display ("LCD"), a light-emitting diode ("LED"), an organic light-emitting diode ("OLED"), or another suitable display screen built into user device 110 that performs a physical transformation of signals to light. In the implementation of FIG. 1, display 110 is touch sensitive and serves as input interface 126 for user device 110. As such, display 110 may be a multi-touch surface and user device 110 may be configured to receive and process multiple touch inputs at one time.

User device 110 further includes processor 112 and memory 114. Processor 112 may be configured to access memory 114 to execute software application 116, or to execute other commands, processes, or programs stored in memory 114. Processor 112 may also be configured to execute software application 116 directly through server 130 over a network. Processor 112 may correspond to a processing device, such as a microprocessor or similar hardware processing device, or a plurality of hardware devices. Memory 114 is a hardware memory capable of storing software application 116 and other commands, processes, and programs for execution by processor 112. Memory 114 may be volatile or non-volatile, hardware or software, and may be instituted as ROM, RAM, flash memory, or any sufficient memory capable of storing a set of instructions. In other implementations, memory 114 may correspond to a plurality of memory types or modules.

Also illustrated in FIG. 1, user device 110 further includes speaker 118. Speaker 118 may include any device capable to outputting instructions or other sounds corresponding to interactions between user 134 and interactive board 102. For example, if interactive board 102 is a board game, speaker 118 may provide instructions, scores, and responses to user inputs to interactive board 102. In one implementation, speaker 118 may be built into user device 110. However, in another implementation, speaker 118 may be external to user device 110 and communicate with user device 110 using any wired or wireless connection.

Also illustrated in FIG. 1, user device 110 further includes microphone 136. Microphone 136 may include any device capable to receiving verbal commands made by user 134 of interactive board 102. For example, certain uses of interactive board 102 may require verbal responses from user 134, and microphone 136 allows user 134 to respond without physically interacting with user device 110, thus creating a more interactive experience. For example, if interactive board 102 is a board game, user 134 of the board game may respond to questions communicated by speaker 118, such as "Do you want to play again?" by verbally responding with "Yes," through microphone 136. In one implementation, microphone 136 may be built into user device 110. However, in another implementation, microphone 136 may be external to user device 110 and communicate with user device 110 using any wired or wireless technology.

Also illustrated in FIG. 1, user device 110 includes software application 116. Software application 116 may include an interactive application executed by user device 110 to interact with interactive board 102. In the implementation of FIG. 1, software application 116 may be stored as a separate, downloadable software application on user device 110 for use with interactive board 102. However, in other implementations, software application 116 may be accessed through a uniform resource locator ("URL"), a universal product code ("UPC") on interactive board 102 that can be scanned by or entered into user device 110 to access software application 116, or by any other suitable method of accessing software applications on user device 110.

For example, in one implementation, interactive board 102 may be a board game. In such an implementation, software application 116 may include an interactive application for use with the board game. For example, when playing the board game, pads 106 may be buttons for use with the board game, such as, for example, a start button, a roll button, a help button, or an attack button if the board game is tailored to a combat type board game. When a user, such as user 134, provides an input to at least one of pads 106, a signal is sent to user device 110 through traces 108 to pads 124 on display 122 of user device 110 and software application 116 executes an appropriate command in response. In one implementation, software application 116 may be configured for use with numerous different board games. However, in another implementation, software application 116 may be tailored to one specific board game.

In addition, user 134 may progress through the game visually by using game pieces 132 on spaces of interactive board 102. Game pieces 134 may also be in contact with pads 106 in order to communicate the user's progression through the game to software application 116. If user 134, for example, selects the help button on the board game a signal is sent to user device 110 and speaker 118 of user device 110 may provide audible instructions for how to play the board game, or how to proceed at any point in the board game. In some scenarios during game play, the user may execute multiple simultaneous commands, such as "attack" and "block," which require inputs to multiple pads of pads 106 on interactive board 102. Display 122 on user device 110 is configured to recognize the multiple simultaneous inputs to the multiple pads of pads 106 and software application 116 is configured to execute the multiple simultaneous commands in response to the multiple simultaneous inputs.

User device 110 may include a user identification (not shown), where the user identification can be stored in memory 114 of user device 110 or on server 130. When user 134 accesses software application 116, software application 116 may recognize the user identification and locate a specific board game, the progress of user 134 through the board game, and/or any perks or other information associated with user 134 in order to enhance game play experience by tailoring the board game to user 134.

In one implementation, software application 116 may also ask for login information associated with user 134 in order to confirm that the original user is user 134 of software application 116, for example. In another implementation, when user 134 accesses software application 116, software application 116 may communicate with server 130 in order to determine historical scores of user 134 or other game attributes associated with user 134, in order to compare user 134 attributes with other users of software application 116. Still in another implementation, software application 116 may use user identification to determine the different board games that user 134 has purchased or used, and may recommend new or additional board games for user 134 to purchase that can be used with software application 116.

Software application 116 may be in communication with server 130 in order to communicate commands from interactive board 102. For example, interactive board 102 may include a user device region for interaction with lighting in a home. When user device 110 is placed on the user device region for interaction with the lighting, and the user subsequently selects a button labeled "kitchen overhead lighting," for example, a signal is sent to server 130. The signal may be sent to server 130 by a JavaScript call to server 130, for example. Server 130 may, in turn, transmit the received signal to a lighting application in the home, which turns the kitchen overhead lights on or off. In another example, the lighting may be wirelessly connected lighting, which is accessible over a wireless fidelity ("Wi-Fi") network. When user 134 selects the button, a signal is sent to the Wi-Fi network and the lighting changes are made. In addition to turning lighting on and off, the buttons on interactive board 102 may control the timing, intensity, color, and/or any other settings associated with the lighting in the home.

It should be noted that the implementation of FIG. 1 illustrates only one user device region on interactive board 102, however, the present disclosure is not limited to the implementation of FIG. 1. For example, in other implementations, interactive board 102 may include multiple user device regions. In such implementations, each of the user device regions may be capable of interacting with at least one system or device. The system or device may be an external device. For example, software application 116 can be used to communicate with surround sound speakers or other electronic systems connected through server 130, or through a network, such as a Wi-Fi network. In such an example, interactive board 102 may have a user device region for the lighting and a user device region for the surround sound speakers, or interactive board 102 may have a single user device region for use with both the lighting and the surround sound speakers. Furthermore, in such implementations, software application 116 can control the systems associated with the user device region(s) through the buttons on the poster.

As discussed above, in one implementation, user device 110 may include the user identification. In such an implementation, once user 134 of user device 110 has been identified, either by associating user device 110 with user 134 or by user 134 entering login information, software application 116 can recognize user 134. Software application 116 may access stored information pertaining to the users previous settings, or preferred settings for the lighting, the surround sounds speakers, and any other systems configured for use with interactive board 102. User 134 may input the preferred settings into software application 116 that relate to custom sequences and/or effects, such as strobe lighting effects, such that when user is identified using the user identification the custom sequences and/or effects are accessible to user 134. In some implementations, once user 134 is identified, the preferred settings associated with user 134 can be automatically implemented, and any changes to the system made by user 134 through interactive board 102 can dynamically adjust the preferred settings It should further be noted that the implementation of FIG. 1 illustrates only one user 134 using interactive board 102, however, the present disclosure is not limited to the implementation of FIG. 1. For example, in other implementations, there may be any number of users playing on interactive board 102. In such implementations, each of the users may use pads 106 to input signals into user device 110.

Turning to FIGS. 2A-2D, it should be noted that pad 206A, pad 206D, and 206F are collectively to referred to as board pads for being located on interactive board 202 directly, outside of user device region 250. Furthermore, pad 206B, 206C and 206E are collectively referred to as device region pads for being located on interactive board 202 within user device region 250. In addition, pad 224B, 224C, and 224E are collectively referred to as device pads for being located on user device 210.

FIG. 2A presents an example of a top view of an interactive board, according to one implementation of the present disclosure. Interactive board 202 of FIG. 2A includes ground flap 204, pad 206A, pad 206B, pad 206C, pad 206D, pad 206E, and pad 206F (collectively referred to as pads 206), user device region 250, space 220A, space 220B, space 220C, space 220D, space 220E, space 220F, space 220G, and space 220H (collectively referred to as spaces 220), trace 208A, trace 208B, and trace 208C (collectively referred to as traces 208), and game piece 232A and game piece 232B (collectively referred to as game pieces 232). With respect to FIG. 2A, it should be noted that interactive board 202, ground flap 204, pads 206, traces 208, and game pieces 232 correspond respectively to interactive board 102, ground flap 104, pads 106, traces 108, and game pieces 132 of FIG. 1.

As illustrated in FIG. 2A, interactive board 202 includes user device region 250. User device region 250 is configured to receive a user device having a touch screen, such as user device 110 from FIG. 1. User device region 250 may be printed on interactive board 202, indented into interactive board 202, and/or be configured to secure a user device within user device region 250. Each of pad 206B, pad 206C, and pad 206E can be partially or fully included as part of user device region 250 and at least a part of traces 208 can be included in user device region 250. In some implementations, the touch screen of the user device is configured to be face down and in contact with user device region 250. In other implementations, user device may be faced up so that the touch screen of user device faces a user when the user device is in contact with user device region 250.

Pads 206 and traces 208 may each include a ground region and a sense region. Pad 206A, pad 206D, and pad 206F are collectively referred to as board pads and pad 206B, pad 206C, and pad 206E are collectively referred to as device region pads. Board pad 206A, board pad 206D, and board pad 206F have interdigitated ground and sense regions. The ground regions of board pad 206A, board pad 206D, and board pad 206F are connected to ground traces of trace 206A, trace 206B, and trace 206C, respectively, and the ground traces are connected to ground flap 204. The sense region of board pad 206A, board pad 206D, and board pad 206F are connected to sense traces of trace 206A, trace 206B, and trace 206C, respectively, and the sense traces are connected to device region pad 206B, device region pad 206C, and device region pad 206E, respectively.

Board pad 206F may include a slider array to recognize a swiping motion by a user, which may be associated with rolling dice. In addition to board pad 206F, either of board pad 206A or board pad 206D may also include a slider array. It should be noted that although only six total pads 206 are illustrated in the implementation of FIG. 2A, any number of pads may be used. In addition, although in the implementation of FIG. 2A each of board pad 206A, board pad 206D, and board pad 206E is connected to a single respective device region pad, in some implementations, more than one board pad may be connected to more than one device region pad, and vice versa.

Spaces 220 may be configured to receive game pieces, such as game pieces 232. Although only two game pieces 232 and eight spaces 220 are illustrated in FIG. 2A, any number of game pieces and spaces may be included with interactive board 202. In the implementation of FIG. 2A, spaces 220 include ground and sense regions for contacting ground and sense regions of game pieces 232. In additional, additional traces may connect the ground regions of spaces 220 to ground flap 204 and additional traces may also connect the sense regions of spaces 220 to user device region 250 for transmitting signals to a user device, such as user device 110 of FIG. 1. However, in other implementations, spaces 220 merely serve as visual spaces used for a visual reminder of progression through a board game, for example.

Figure 2B:
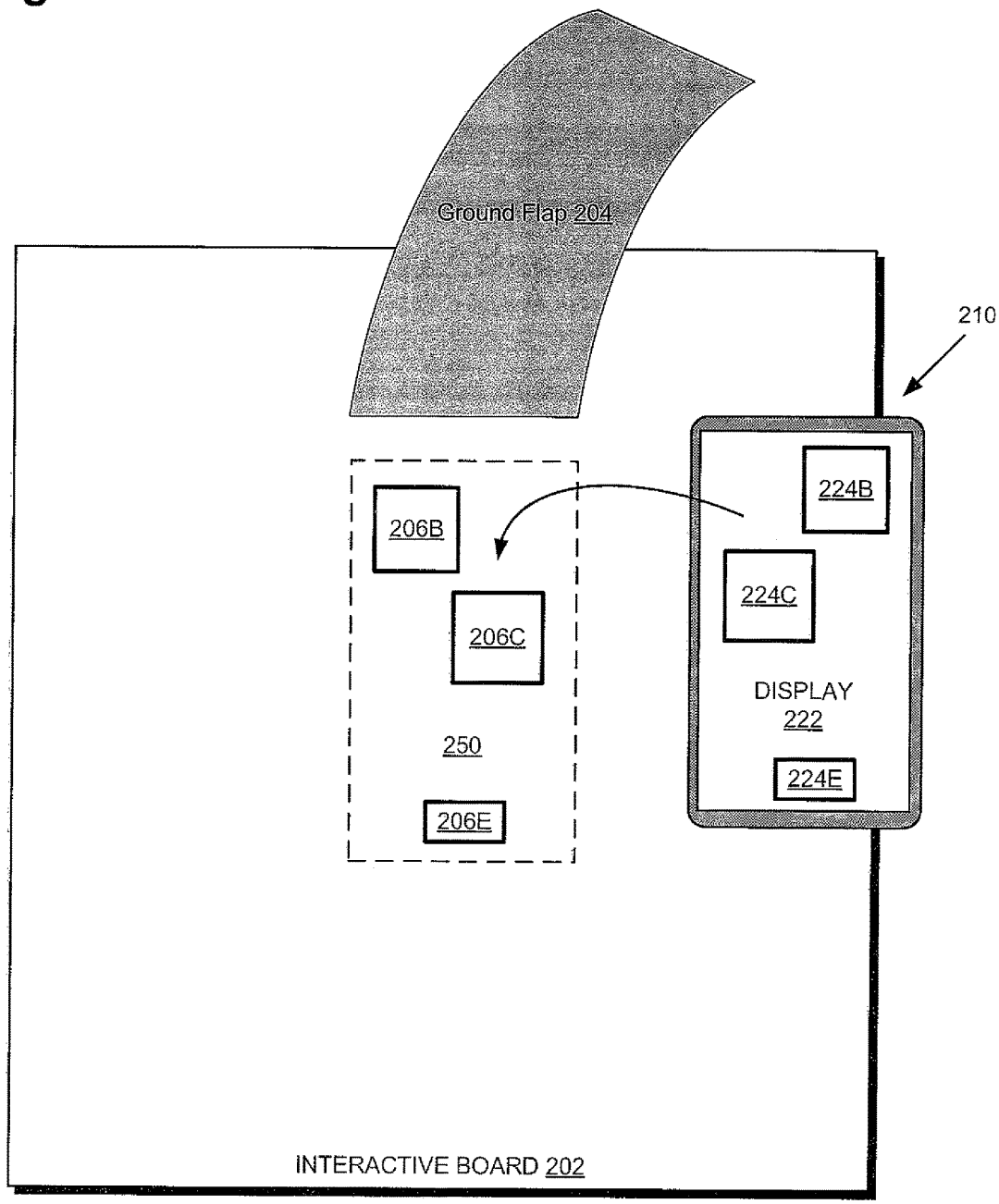
FIG. 2B presents an example of an interactive board receiving a user device, according to one implementation of the present disclosure.

FIG. 2B presents and example of an interactive board receiving a user device, according to one implementation of the present disclosure. Interactive board 202 of FIG. 2B includes ground flap 204, pad 206B, pad 206C, and pad 206E, and user device region 250. User device 210 includes pad 224B, pad 224C, and pad 224E and display 222. Pad 224B, pad 224C, and pad 224E are collectively referred to as device pads 224. With respect to FIG. 2B, it should be noted that user device 210, display 222, and device pads 224 correspond respectively to user device 110, display 122, and pads 124 of FIG. 1.

As illustrated in the implementation of FIG. 2B, user device 210 is placed onto interactive board 202 within user device region 250, where user device 210 is oriented such that display 222 contacts user device region 250. Once user device 210 is placed within user device region 250, device region pad 206B, device region pad 206C, and device region pad 206E of interactive board 202 line up with and contact device pad 224B, device pad 224C, and device pad 224E of user device 210, respectively. After contact is made, signals received by device region pad 206B, device region pad 206C, and device region pad 206E can be transmitted to device pads 224 for processing by user device 210.

It should be noted that the implementation of FIG. 2B only illustrates user device region 250 as including dimensions that match the dimensions of user device 210, however, the present disclosure is not limited to the implementation of FIG. 2B. For example, in some implementations, user device region 250 may include larger or smaller dimensions than user device 210. In such implementations, a software application executing on user device 210 may generate device pads 224 so that device pad 224B, device pad 224C, and device pad 224E still align with device region pads 206B, 206C, and 206E, respectively. For example, if user device region 250 is configured for a tablet computer but the user of interactive board 202 is running the software application on a mobile phone, the software application may be configured to generate device pads 224 as close to the outer edges of display 222 in order to ensure a connection with device region pad 206B, device region pad 206C, and device region pad 206E on user device region 250.

Figure 2C:
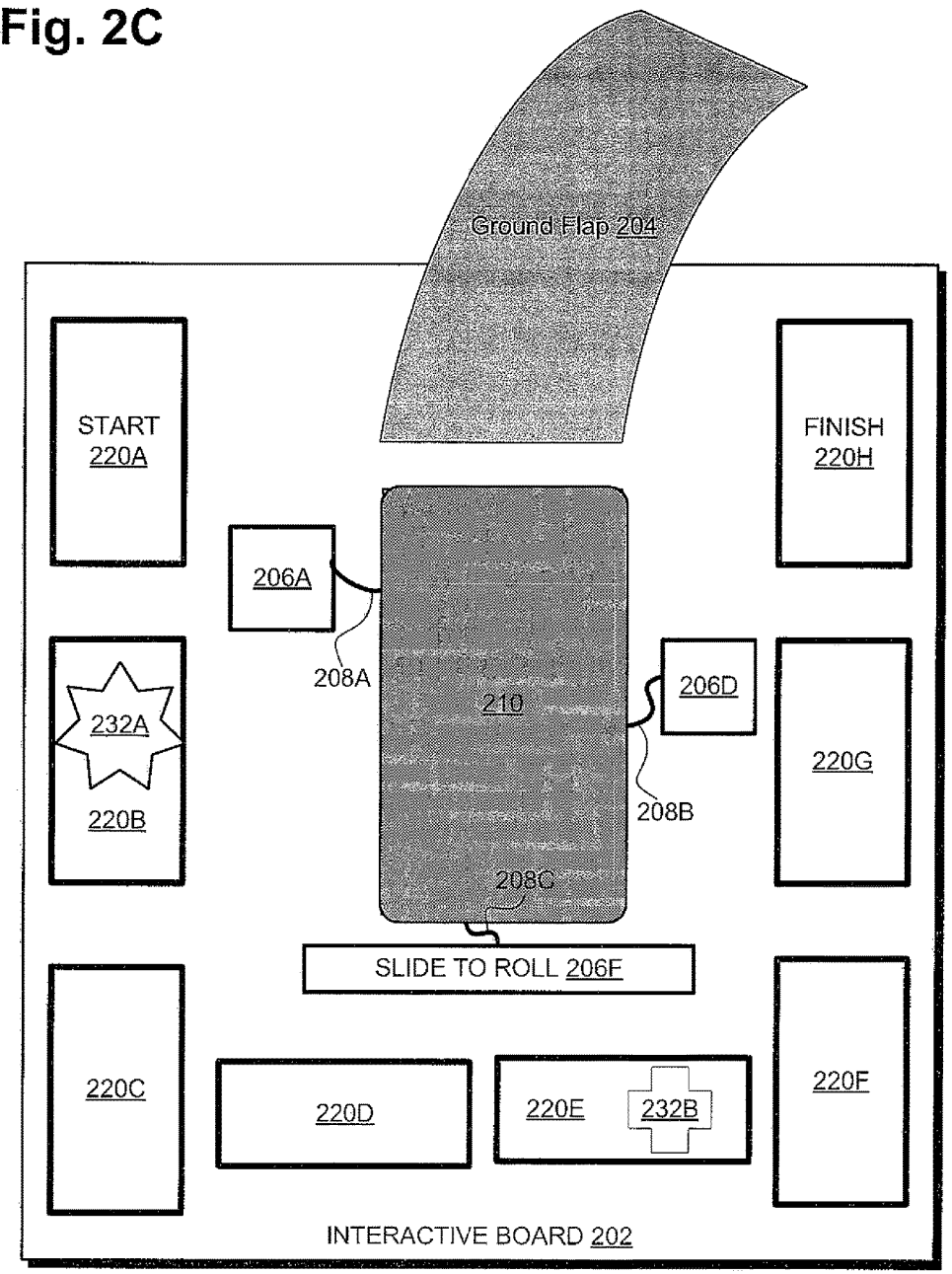
FIG. 2C presents an example of a user device placed on an interactive board, according to one implementation of the present disclosure.

FIG. 2C presents an example of a user device placed on an interactive board, according to one implementation of the present disclosure. Interactive board 202 of FIG. 2C includes ground flap 204, pad 206A, pad 206D, and pad 206F, spaces 220, traces 208, and game pieces 232.

As illustrated in the implementation of FIG. 2C, user device 210 is placed display 222 side down on interactive board 202 such that user device region 250, device region pad 206B, region pad 206C, and region pad 206E, and part of traces 208 are covered by user device 210. As such, user device 210 is now in contact with interactive board 202. For example, device region pad 206B, device region pad 206C, and device region pad 206E of interactive board 202 are now in contact with device pad 224B, device pad 224C, and device pad 224E of user device 210, respectively.

It should be noted that the implementation of FIG. 2C only illustrates user device 210 placed on interactive board 202, however, the present disclosure is not limited to the implementation of FIG. 2C. In other implementations, and as discussed above, user device region 250 may be indented within interactive board 202. In such implementations, user device 210 may be situated within user device region 250. Furthermore, in other implementations, interactive board 202 may include a fastening device to hold user device 210 in user device region 250.

Figure 2D:
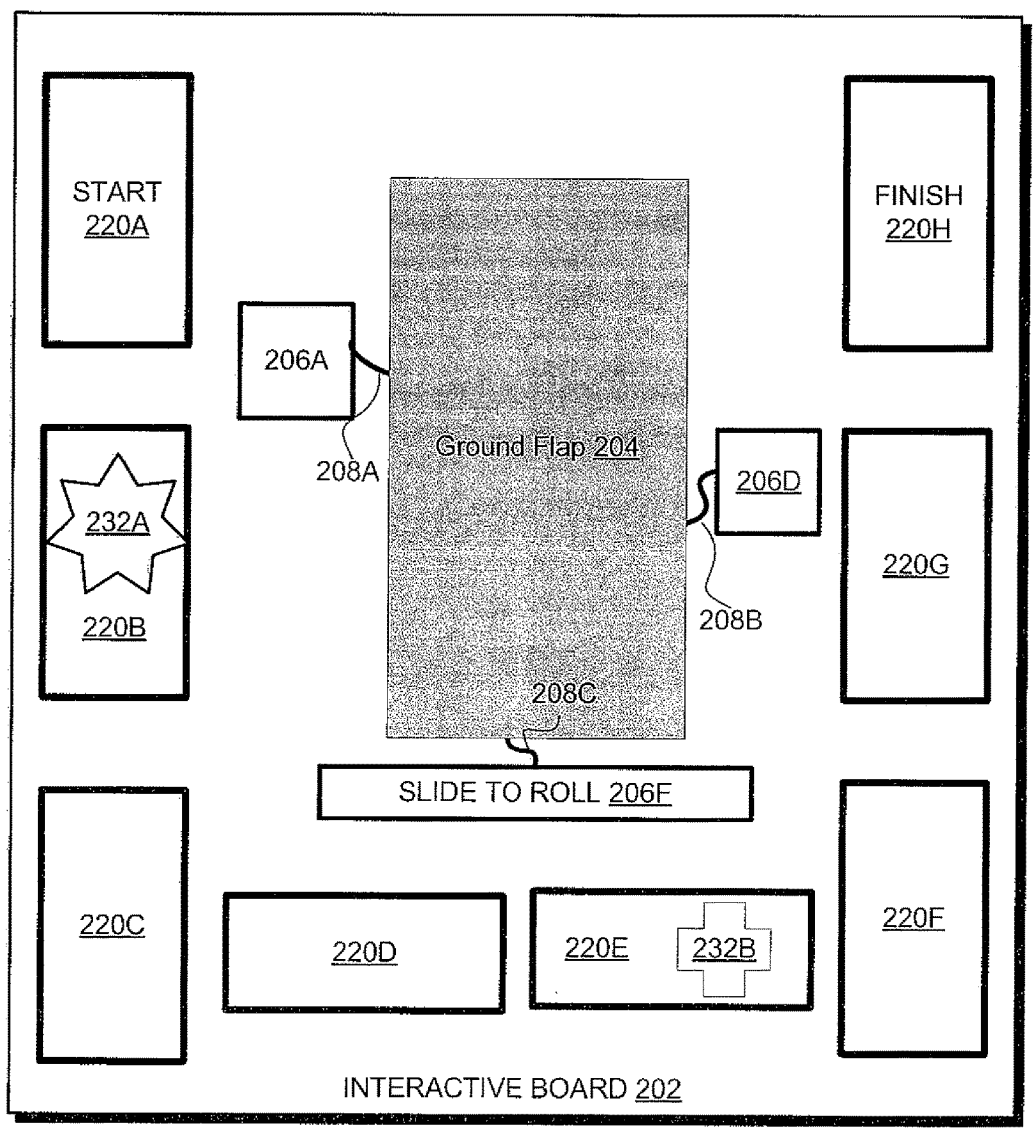
FIG. 2D presents an example of a ground flap being placed on a user device, according to one implementation of the present disclosure.

FIG. 2D present an example of a ground flap being placed on a user device, according to one implementation of the present disclosure. Interactive board 202 of FIG. 2D includes ground flap 204, pad 206A, pad 206D, and pad 206F, spaces 220, traces 208, and game pieces 232.

As illustrated in the implementation of FIG. 2D, ground flap 204 is now placed over the back of user device 210 from FIG. 2C. Ground flap 204 provides a reference for user device 210 so that display 222, which includes a touch screen display, can recognize user inputs to board pad 206A, board pad 206D, and board pad 206F. When a user supplies an input, such as a finger proximity or touch, to either of board pad 206A, board pad 206D, and board pad 206F, a signal, such as a capacitance change, is transmitted by the sense traces of trace 208A, trace 208B, or trace 206F to device region pad 206B, device region pad 206C, or device region pad 206E, respectively. Device region pad 206B, device region pad 206C, and device region pad 206E of interactive board 202 then transmit the signal to device pad 224B, device pad 224C, and device pad 224E on display 222 of user device 210, respectively.

The input to either of board pad 206A, board pad 206D, and board pad 206F also relates the signal by the ground traces of traces 208 to ground flap 204. As a result, the input and signal are relative to the ground over the back area of user device 210 by ground flap 204 and also received by display 222 of user device 210 so that user device 210 recognizes the input. The input is then processed by the software application, such as software application 116 of FIG. 1, on user device 210 and the appropriate commands are executed.

It should be noted that the implementation of FIG. 2D only illustrates ground flap 204 as completely covering user device 210, however, the present disclosure is not limited to the implementation of FIG. 2D. For example, in some implementations, ground flap 204 may only partially cover user device 210, so that a portion of the back area of user device 210 would still be visible.

Figure 3A:
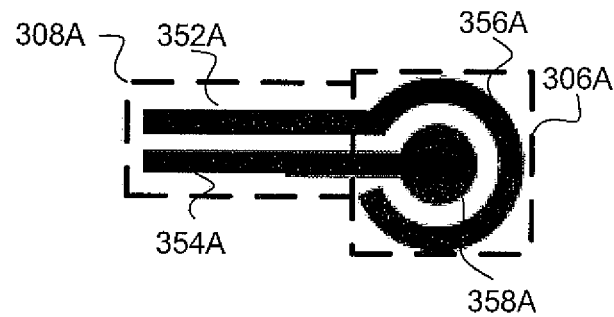
FIG. 3A presents a first example of an interdigitated pad and trace combination of an interactive board, according to one implementation of the present disclosure.

FIG. 3A present a first example of an interdigitated pad and trace combination for an interactive board, according to one implementation of the present disclosure. FIG. 3A includes pad 306A and trace 308A. Pad 306A includes ground pad 356A and sense pad 358A. Trace 308A includes ground trace 352A and sense trace 354A. With respect to FIG. 3A, it should be noted that pad 306A and trace 308A correspond respectively to one of pads 106 and traces 108 of FIG. 1.

As illustrated in FIG. 3A, pad 306A includes ground pad 356A and sense pad 358A. Ground pad 356A and sense pad 358A are interdigitated, meaning that the ground and sense lines are interleaved so a single input by a user, such as a touch input with a finger, would contact or interact with both ground pad 356A and sense pad 358A. When the input is made with ground pad 356A, the signal is made relative via ground trace 352A to a ground flap, such as ground flap 204 from FIGS. 2A-2D. When the input is made with sense pad 358A, the signal is transmitted along sense trace 354A to the device region pads, such as device region pad 206B, device region pad 206C, and device region pad 206E of FIGS. 2A-D. As a result, the user device can recognize a change in relative capacitance as a result of the single touch input by the user because the touch is relative to the ground flap and sensed by the display of the user device simultaneously.

Figure 3B:
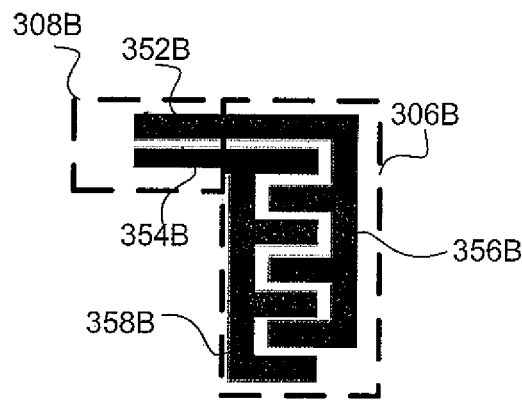
FIG. 3B presents a second example of an interdigitated pad and trace combination of an interactive board, according to one implementation of the present disclosure.

FIG. 3B presents a second example of an interdigitated pad and trace combination for an interactive board, according to one implementation of the present disclosure. FIG. 3B includes pad 306B and trace 308B. Pad 306B includes ground pad 356B and sense pad 358B. Trace 308B includes ground trace 352B and sense trace 354B. With respect to FIG. 3B, it should be noted that pad 306B and trace 308B correspond respectively to one of pads 106 and traces 108 of FIG. 1.

As illustrated in FIG. 3B, pad 306B includes ground pad 356B and sense pad 358B. Ground pad 356B and sense pad 358B are interdigitated, meaning that a single input by a user, such as a touch input with a finger, would be proximal or in contact with both ground pad 356B and sense pad 358B. When the input is made with ground pad 356B, the signal is made relative via ground trace 352B to a ground flap, such as ground flap 204 of FIGS. 2A-2D. When the input is received by sense pad 358B, the signal is transmitted along sense trace 354B to the device region pads, such as device region pad 206B, device region pad 206C, and device region pad 206E of FIGS. 2A-D. As a result, the user device can recognize a change in relative capacitance as a result of the single touch input by the user because the touch is relative to the ground flap and sensed by the display of the user device simultaneously.

Figure 3C:
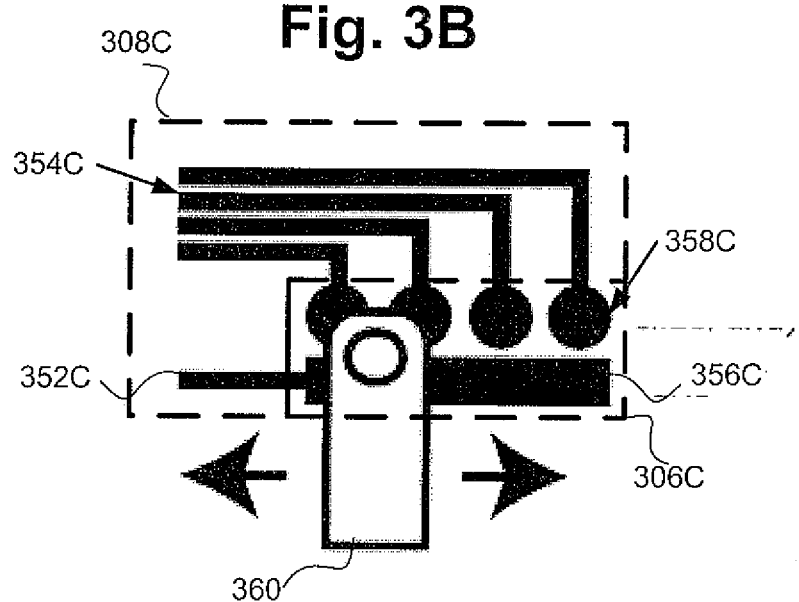
FIG. 3C presents an example of a pad and trace combination to simulate a slider or slide gesture, according to one implementation of the present disclosure.

FIG. 3C presents a third example of a pad and trace combination for an interactive board, according to one implementation of the present disclosure. FIG. 3C includes pad 306C and trace 308C. Pad 306C includes ground pad 356C and sense pad array 358C. Trace 308C includes ground trace 352C and sense trace array 354C. With respect to FIG. 3C, it should be noted that pad 306C and trace 308C correspond respectively to one of pads 106 and traces 108 of FIG. 1.

As illustrated in FIG. 3C, pad 306C includes ground pad 356C and sense pad array 358C. Ground pad 356C and sense pad array 358C allow a single gesture input by a user, such as a swiping touch input with a finger in either direction indicated by the arrows, would contact both ground pad 356C and sense pad array 358C. When the input is made with ground pad 356C, the signal is made via ground trace 352C to a ground flap, such as ground flap 204 from FIGS. 2A-2D. When the input is sequentially made along sense pad array 358C, the signals are transmitted along sense trace array 354C to the device region pads, such as device region pad 206B, device region pad 206C, and device region pad 206E of FIGS. 2A-D. As a result, the user device can recognize the sequential changes in relative capacitances as a result of the gestural touch input by the user because the touch is relative to the ground flap and sensed by the display of the user device simultaneously. Sense pad array 358C and respective device region pads 206B need not be linear nor one dimensional, so more general gestural inputs may be made and recognized.

Figure 4A:
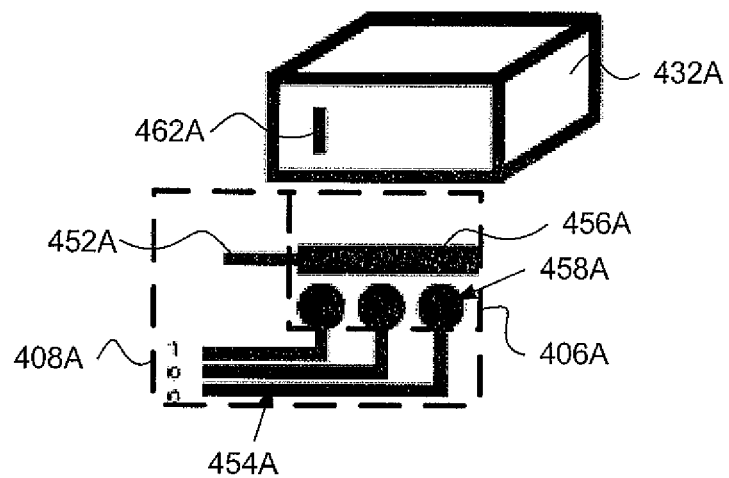
FIG. 4A presents a game piece and a pad and trace combination of a space of an interactive board, according to one implementation of the present disclosure.

FIG. 4A presents a game piece and a pad and trace combination of a space of an interactive board, according to one implementation of the present disclosure. FIG. 4A includes game piece 432A, pad 406A, and trace 408A. Pad 406A includes ground pad 456A and sense pad array 458A. Trace 408A includes ground trace 452A and sense trace array 454A. Game piece 432A includes identification ("ID") trace/capacitor 462A. With respect to FIG. 4A, it should be noted that pad 406A and trace 408A correspond respectively to one of pads 106 and traces 108 of FIG. 1. It should further be noted that game piece 432A corresponds to one of game pieces 132 of FIG. 1.

In some implementations, a software application executing on a user device utilizes a binary code in order to recognize which game piece is located on a particular space on the interactive board, such as software application 116 executing on user device 110 of FIG. 1. For example, when game piece 432A comes into contact with ground pad 456A and sense pad array 458A, only ID trace/capacitor 462A is recognized because game piece 432A has a unique identification code 1:0:0. This allows a signal to be transmitted only along the first sense trace of sense trace array 454A to a device pad on the display of the user device. As illustrated in FIG. 4A, a binary number "1" is provided at the first sense trace while binary "0" is provided for the second and third sense traces. As such, when game piece 432A comes into contact with ground pad 456A and sense pad array 458A, the hardware in the user device can detect the change in capacitance across the ground pad 456A and sense pad array 458A caused by the presence of the ID trace/capacitor 462A, and the software application executing on the user device can recognize that game piece 432A is located on the particular space of the interactive board due to recognizing the identification code 1:0:0. The location of game piece 432A can then be saved in the memory, or stored on the server, so that the user can resume use of the interactive board where they left off. In some implementations, sense pad array 458A may include three pads. In such an implementation, a 3-bit ID pattern may be detected which allows for eight different IDs.

In one implementation, game piece 432A can include a presence trace or capacitor in addition to ID trace/capacitor 462A. The presence trace allows game piece 432A to be continuously recognized by the software application executing on the user device so long as game piece 432A is in contact with one of the spaces on the interactive board. Due to game piece 432A including ground and sense regions for making contact with ground pad 456A and sense pad array 458A, respectively, a relative capacitance change from ID trace/capacitor 462A can be consistently measured even without an input being supplied by the user of game piece 432A. However, in other implementations, the presence trace is not required for game piece 432A to be recognized, but can be inferred from the ID traces alone.

Figure 4B:
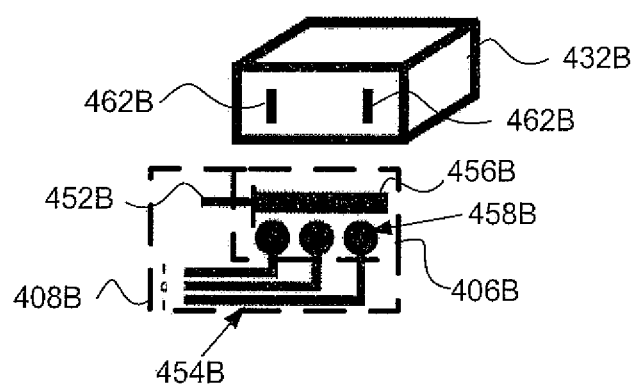
FIG. 4B presents an example of another game piece for a different player, according to one implementation of the present disclosure.

FIG. 4B presents an example of another game piece for a different player, according to one implementation of the present disclosure. FIG. 4B includes game piece 432B, pad 406B, and trace 408B. Pad 406B includes ground pad 456B and sense pad array 458B. Trace 408B includes ground trace 452B and sense trace array 454B. Game piece 432B includes identification ("ID") trace/capacitor 462B. With respect to FIG. 4B, it should be noted that pad 406B and trace 408B correspond respectively to one of pads 106 and traces 108 of FIG. 1. It should further be noted that game piece 432B corresponds to one of game pieces 132 of FIG. 1.

In the implementation of FIG. 4B, when game piece 432B comes into contact with ground pad 456B and sense pad array 458B, only ID traces/capacitors 462B are recognized because game piece 432B has a unique identification code 1:0:1. This allows signals to be transmitted only along the first and third sense trace of sense trace array 454B to the device pad on the display of the user device. As can be seen in FIG. 4B, a binary number "1" is provided at the first and third sense traces while binary "0" is provided for the second sense trace. As such, when game piece 432B comes into contact with ground pad 456B and sense pad array 458B, the hardware in the user device can detect the change in capacitance across the ground pad 456B and sense pad array 458B caused by the presence of the ID traces/capacitors 462B, and the software application executing on the user device can recognize that game piece 432B is located on the particular space of the interactive board due to recognizing the identification code 1:0:1. The location of game piece 432B can then be saved in the memory, or stored on the server, so that the user can resume use of the interactive board where they left off.

In one implementation, game piece 432B may further include a presence trace/capacitor in addition to ID trace/capacitor 462B, similar to the presence trace of game piece 432A described above with regard to FIG. 4A.

Figure 5A:
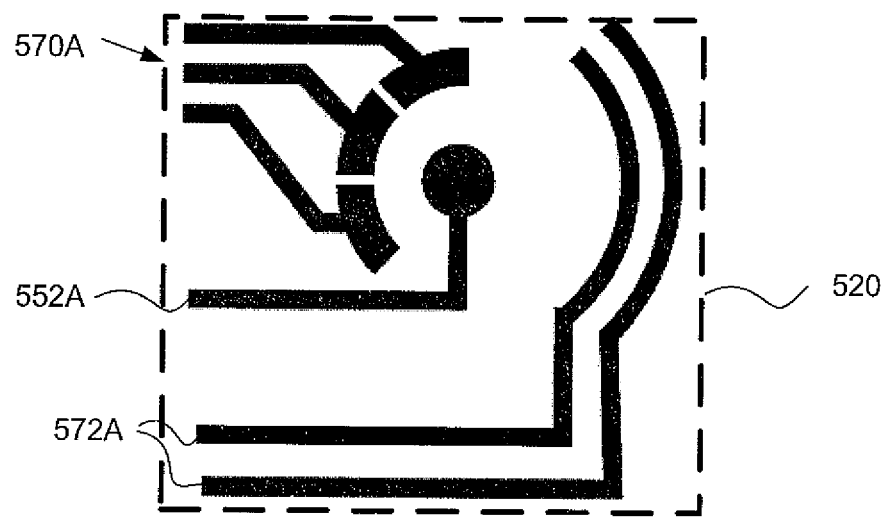
FIG. 5A presents a pad for use with a game piece, according to one implementation of the present disclosure.

FIG. 5A presents a pad for use with a game piece, according to one implementation of the present disclosure. Space 520 of FIG. 5A includes rotation code sense pad array 570A, ground 552A, and identification ("ID") code sense pad array 572A. With respect to FIG. 5A, it should be noted that space 520 corresponds to one of spaces 220 from FIGS. 2A-D.

As illustrated in FIG. 5A, space 520 includes rotation code sense pad array 570A. Rotation code sense pad array 570A is configured to receive a game piece, such as game piece 532B of FIG. 5B, which is described in more detail below. When the game piece contacts the space, including rotation code sense pad array 570A, a signal is transmitted by the traces connected to the space to the display of the user device, such as traces 108 transmitting the signal to display 122 of user device 110 in FIG. 1. Rotation code sense pad array 570A allows the software application executing on the user device to recognize a rotation of the game piece in contact with rotation code 570A. As illustrated, the three pads in rotation code sense pad array 570A may detect a 3-bit rotation code or eight different rotation positions.

For example, in an implementation where the interactive board is a board game, the game piece may require rotation in order to progress through the game, or to act as a control knob. Rotation code sense pad array 570A allows for the rotation of the game piece to be recognized by the software application so the progress can be tracked. For example, if the game piece is a control knob, the rotation of the game piece can be tracked to adjust volume for the board game. The rotation of the game piece can then be saved in the memory, or stored on the server, so that the user can resume use of the interactive board where they left off.

Also illustrated in FIG. 5A, space 520 includes ground 552A. Ground 552A connects the game piece to the ground flap, so that a relative capacitance change can be measured as long as the game piece is on the space of the interactive board. Ground 552A works similarly to ground pad 452A and ground pad 452B in FIG. 4A and FIG. 4B, respectively.

Also illustrated in FIG. 5A, space 520 includes ID code sense pad array 572A. ID code sense pad array 572A is configured to enable the software application to identify which game piece is in contact with the space on the interactive board. ID code 572A works similarly to sense pad array 458A of FIG. 4A.

It is noted that the implementation of FIG. 5A only illustrates ID code 572A including two lines, however, the present disclosure is not limited to the implementation of FIG. 5A. For example, in other implementations, ID code 572A may include any number of lines.

Figure 5B:
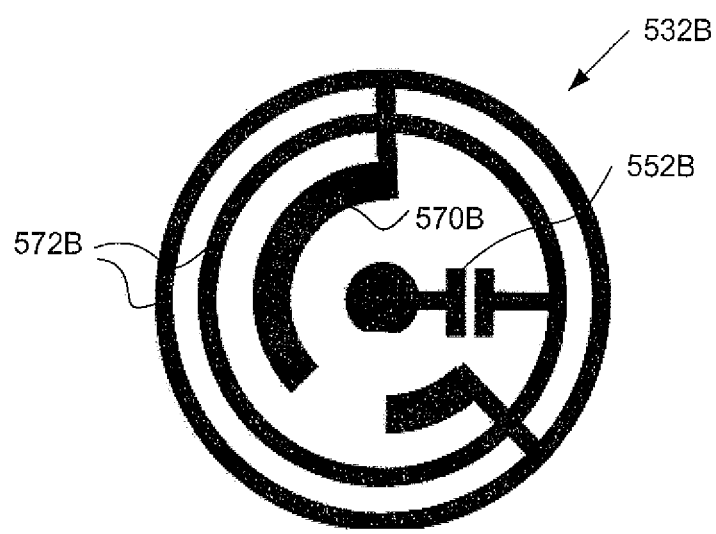
FIG. 5B presents a game piece for use with the pad of FIG. 5A, according to one implementation of the present disclosure.

FIG. 5B presents a game piece for use with the pad of FIG. 5A, according to one implementation of the present disclosure. FIG. 5B includes game piece 532B. Game piece 532B includes ground 552B, identification (ID) trace 572B, and rotation code 570B. As illustrated in of FIG. 5B, game piece 532B includes rotation code 570B. When game piece 532B is placed on the space of the interactive board, such as space 520 of FIG. 5A, rotation code 570B of game piece 532B is configured to contact rotation code sense pad array 570A from space 520. The signal pattern is then transmitted to the hardware of the user device and the software application executing on the user device, such as software application 116 executing on user device 110. The hardware can then detect the capacitance changes, and the software application can then decode and recognize the rotation of game piece 552B on space 520 of the interactive board.

Also illustrated in FIG. 5B, game piece 532B includes ground 532B. When game piece 532B is placed on space 520 of the interactive board, ground 552B of game piece 532B is configured to contact ground 552A of space 520 of FIG. 5A. By grounding game piece 532B to space 520, the software application can continuously recognize the presence of game piece 532 on the interactive board.

Also illustrated in FIG. 5B, game piece 532B includes rotation code 570B. When game piece 532B is placed on space 520 of the interactive board, rotation code 570B of game piece 532B is configured to contact rotation code sense pad array 570A of space 520 from FIG. 5A. Game piece 532B includes a pattern of rotation codes 570B laid out in a DeBruijin sequence pattern, illustrated in FIG. 5B as a (2,3) DeBruijin code. The use of the (2,3) DeBruijin code pattern for rotation code 570B allows the identification of one of eight unique rotation values from any three consecutive signals between the rotation code 570B and the illustrated three pads in the rotation code sense pad array 570A.

Also illustrated in FIG. 5B, game piece 532B includes ID trace 572B. When game piece 532B is placed on space 520 of the interactive board, ID trace 572B of game piece 532B is configured to contact ID code sense pad array 572A of space 520 from FIG. 5A. Game piece 532B includes two concentric circles that make up ID trace 572B, and ID code 572A includes two lines. As a result, when ID trace 572B contacts ID code 572A, a binary code of 1:1 is recognized by the software application, regardless of rotation of game piece 532B. ID code 572A and ID trace 572B work similarly to ID traces 462A and sense pad array 458A of FIG. 4A and similarly to ID traces 462B and sense pad array 458B of FIG. 4B.

It is noted that the implementation of FIG. 5B only illustrates ID trace 572B including two concentric circles, however, the present disclosure is not limited to the implementation of FIG. 5B. For example, in other implementations, ID trace 572B may include any number of concentric circles. For another example, still in other implementations, ID trace 572B may include lines, squares, or any other configuration.

Figure 6A:
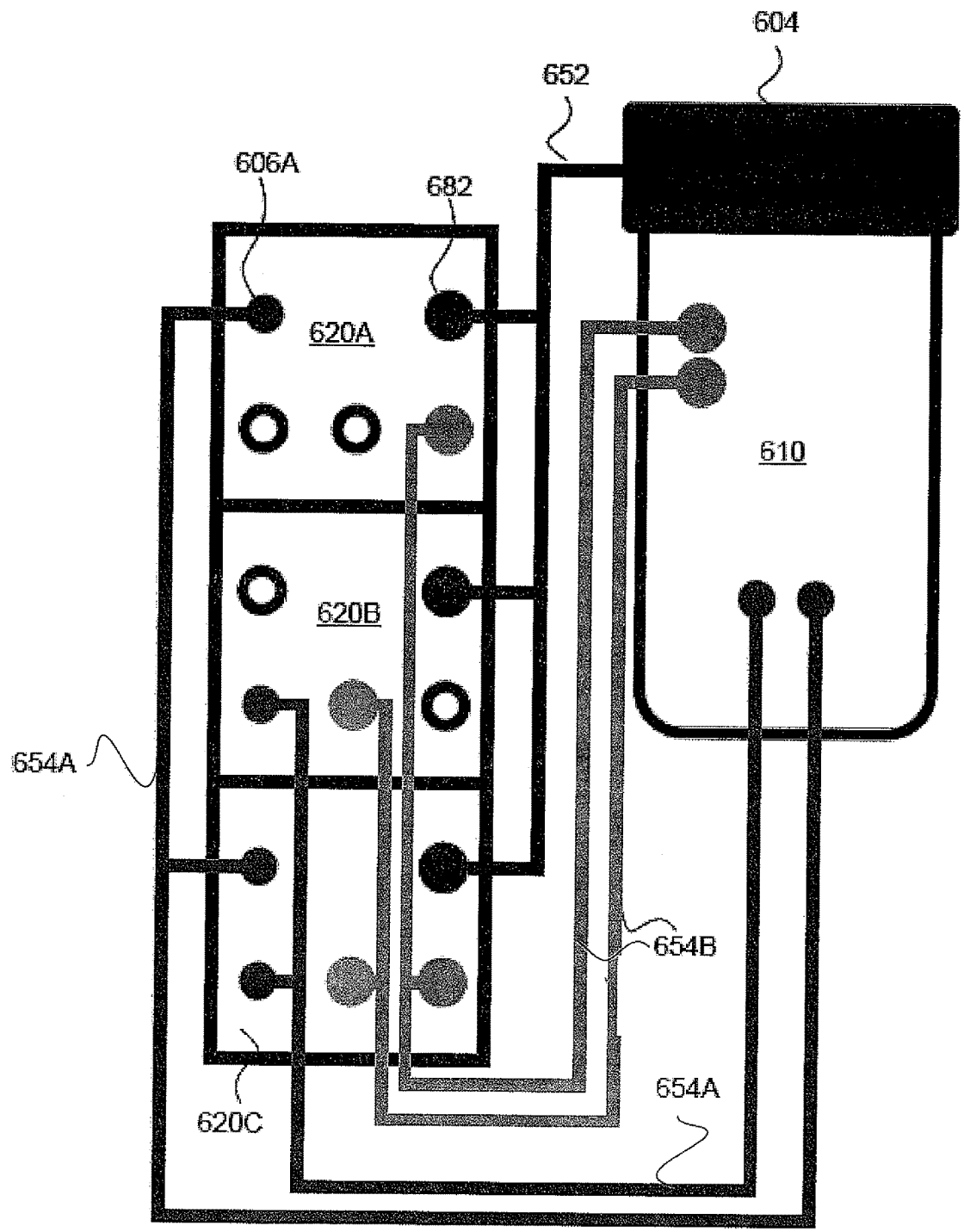
FIG. 6A presents an interactive board, according to one implementation of the present disclosure.

FIG. 6A presents an interactive board, according to one implementation of the present disclosure. FIG. 6A includes user device 610, ground flap 604, space 620A, space 620B, and space 620C (collectively referred to as spaces 620), sense trace 654A and sense trace 654B (collectively referred to as sense traces 654), ground trace 652, ground pad 682, and sense pad 606A. With respect to FIG. 6A, it should be noted that spaces 620 correspond to spaces 220 of FIG. 2A, FIG. 2C, and FIG. 2D. It should further be noted that ground flap 604 and user device 610 correspond respectively to ground flap 104 and user device 110 of FIG. 1.

Spaces 620 are used to track the position of the game pieces on the interactive board, such as game piece 632A and game piece 632B, which will be described in further detail below in reference to FIG. 6B. Spaces 620 at least partially include sense traces 654 and ground trace 652. Each of sense traces 654 are coupled to a plurality of sense pads. For example, sense trace 654A is coupled to sense pad 606A on space 620A. Ground trace 652 is coupled to a plurality of ground pads. For example, ground trace 652 is coupled to ground pad 682 on space 620A.

Sense traces 654 may be configured to recognize the position and ID of game pieces that they come into contact with. For example, if a game piece contacts space 620A, such as game piece 632A of FIG. 6B, sense traces 654 are configured to transmit signals unique to the game piece. The signal sent along sense traces 654 may indicate that the game piece is positioned at a certain space on the interactive board, such as space 620A. The signal sent along sense traces 654 may also indicate that the game piece is game piece 632A based on its unique ID, similar to the ID recognition described above with reference to FIG. 4A, FIG. 4B, FIG. 5A, and FIG. 5B. As a result, when the signal is transmitted to user device 610, the software application executing on user device 610 recognizes, and in some implementations stores, the position of game piece 632A.

Ground trace 652 connects the game piece from ground pad 682 via ground trace 652 to ground flap 604.

Figure 6C:
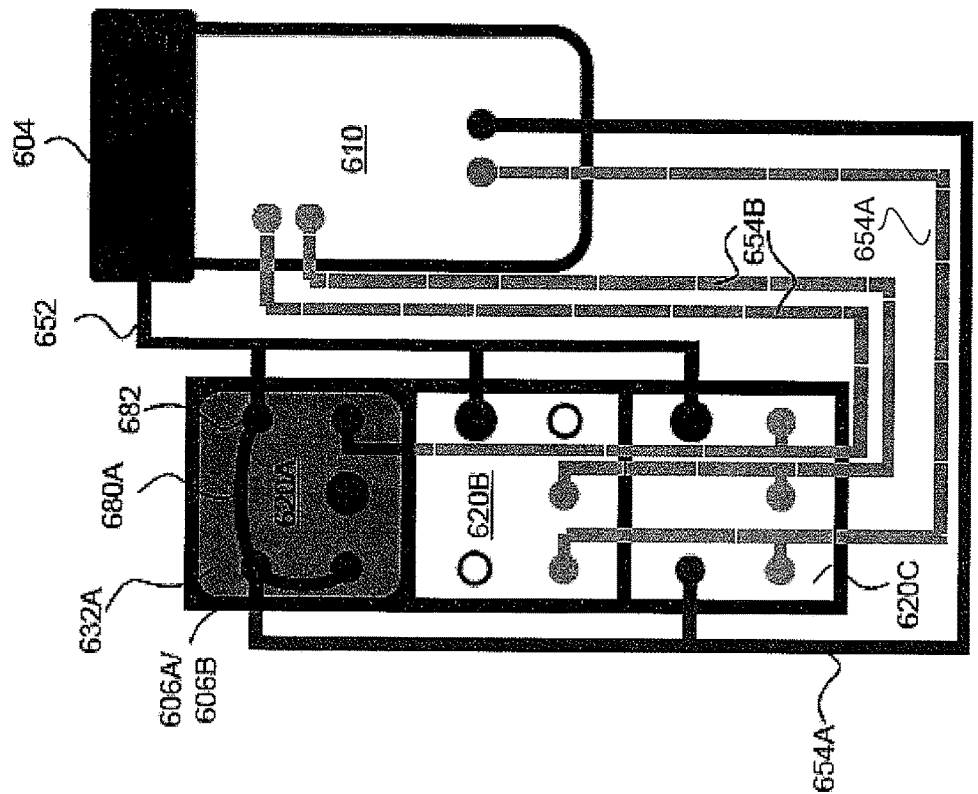
FIG. 6C presents the interactive board of FIG. 6A and a game piece, according to one implementation of the present disclosure.
Figure 6B:
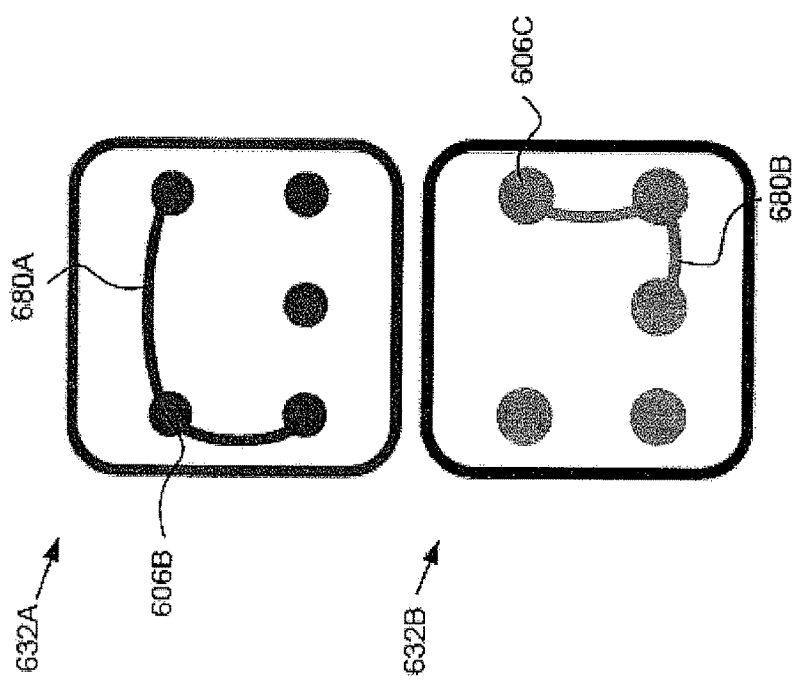
FIG. 6B presents game pieces of an interactive board, according to one implementation of the present disclosure.

FIG. 6B presents game pieces of an interactive board, according to one implementation of the present disclosure. FIG. 6B includes game piece 632A and game piece 632B (collectively referred to as game pieces 632). Game piece 632A includes sense pad 606B and sense trace 680A. Game piece 632B includes sense pad 606C and sense trace 680B. With reference to FIG. 6B, it should be noted that game pieces 632 correspond to game pieces 132 in FIG. 1.

Sense pad 606B and sense pad 606C of game piece 632A and game piece 632B, respectively, are configured to contact the sense pads coupled to sense traces 654 of FIG. 6A, such as sense pad 606A. Once a connection or coupling is made between the sense pads of the spaces on the interactive board and sense pad 606B and/or sense pad 606C of game piece 632A and game piece 632B, a signal can be transmitted to and detected by user device 610.

Sense trace 680A and sense trace 680B of game piece 632A and game piece 632B, respectively, are configured to couple each of the sense pads of game piece 632A and game piece 632B to each sense pad. However, as presented in the implementation of FIG. 6B, different sense pads can be coupled by sense trace 680A and sense trace 680B to create different combinations of coupled sense pads. The different combinations create unique ID combinations for each game piece. For example, game piece 632A includes two sense traces coupled to sense pad 606B, including sense trace 680A. Game piece 632B includes two sense traces coupled to sense pad 606C, including sense trace 680B. As a result, each of game pieces 632 has a unique ID that is configured to be recognized by a software application executing on a user device when game piece 632A and/or game piece 632B contact spaces on an interactive board.

It should be noted that when the sense pads on game piece 632A and game piece 632B contact a ground pad coupled to a ground trace on the interactive board, such as ground pad 682 coupled to ground trace 652 in FIG. 6A, the sense pads may then be referred to as ground pads.

FIG. 6C presents the interactive board of FIG. 6A and a game piece, according to one implementation of the present disclosure. FIG. 6C includes user device 610, ground flap 604, spaces 620, sense trace 654A and sense trace 654B, ground trace 652, ground pad 682, sense pad 606A, and game piece 632A. Game piece 632A includes sense trace 680A and sense pad 606B.

As illustrated in FIG. 6C, game piece 632A is in contact with space 620A. Sense pad 606A of space 620A is in contact with sense pad 606B of game piece 632A. Another sense pad of game piece 632A is in contact with ground pad 682. As a result, a signal is made relative via ground trace 652 to ground flap 604 to ground the signal on a back area of user device 610. Furthermore, the signal is transmitted along sense trace 654A to a display of user device 610. Hardware in user device 610 and a software application executing on user device 610 is configured to recognize the change in capacitance of the signal transmitted to the display in order to recognize the position and ID of game piece 632A. The software application can then proceed with a board game or other interactive use of the interactive board in accordance with the position and ID of game piece 632A.

Although the implementation of FIG. 6C only illustrates one game piece 632A as contacting the interactive board, the present disclosure is not limited to the implementation of FIG. 6C. In other implementations, the interactive board may be configured to recognize any number of game pieces at any time. For example, the interactive board is configured to recognize both game piece 632A and game piece 632B from FIG. 6B.

FIG. 7 shows a flowchart illustrating a method for creating an interactive board for use with a user device having a touch screen, according to one implementation of the present disclosure. The approach and technique indicated by flowchart 700 are sufficient to describe at least one implementation of the present disclosure, however, other implementations of the disclosure may utilize approaches and techniques different from those shown in flowchart 700. Furthermore, while flowchart 700 is described with respect to FIG. 2A, FIG. 2B, FIG. 2C, and FIG. 2D, the disclosed inventive concepts are not intended to be limited by specific features shown and described with respect to those FIG. 2A, FIG. 2B, FIG. 2C, and FIG. 2D. Furthermore, with respect to the method illustrated in FIG. 7, it is noted that certain details and features have been left out of flowchart 700 in order not to obscure the discussion of inventive features in the present application.

Referring now to flowchart 700 of FIG. 7, flowchart 700 (at 710) includes disposing a plurality of board pads on an interactive board. For example, board pad 206A, board pad 206D, and board pad 206F can be disposed on interactive board 202. As discussed above, at least one of board pad 206A, board pad 206D, and board pad 206F may include a slider array configured to recognize a swiping motion by a user, such as user 134 of FIG. 1. Furthermore, board pad 206A, board pad 206D, and board pad 206F may include interdigitated ground and sense regions, and may be configured to connect to trace 208A, trace 208B, and trace 208C, respectively, to transmit signals to user device 210.

Referring again to FIG. 7, flowchart 700 (at 720) further includes configuring a user device region on the interactive board to receive a touch screen of a user device. For example, user device region 250 may be configured on interactive board 202 to receive display 122 of user device 210, where display 122 corresponds to a touch screen of user device 210. User device region 250 includes device region pad 206B, device region pad 206C, and device region pad 206E, which are configured to receive signals from board pad 206A, board pad 206D, and board pad 206F, respectively, in response to an input to any of board pad 206A, board pad 206D, and board pad 206F. User device region 250 may be configured for a specific user device such as a mobile phone, a tablet, or a handheld computer, for example.

Referring again to FIG. 7, flowchart 700 (at 730) further includes providing a plurality of traces for coupling the plurality of board pads to device region pads. For example, trace 208A is provided to couple board pad 206A to device region pad 206B, trace 208B is provided to couple board pad 206D to device region pad 206C, and trace 208C is provided to couple board pad 206F to device region pad 206E. Board pad 206A, board pad 206D, and board pad 206F are coupled to trace 208A, trace 208B, and trace 208C, respectively, by a sense trace region of trace 208A, trace 208B, and trace 208C.

Referring again to FIG. 7, flowchart 700 (at 740) further includes connecting a ground flap to a ground region of each of the plurality of board pads. For example, ground flap 204 is connected to a ground region of each of board pad 206A, board pad 206D, and board pad 206F. As discussed above, each of trace 208A, trace 208B, and trace 208C includes a ground trace region that couples each of board pad 206A, board pad 206D, and board pad 206F to ground flap 204. As a result, when an input is received by board pad 206A, for example, the signal is transmitted along a sense trace region of trace 208A to device region pad 206B relative via the ground trace region of trace 208A to ground flap 204. Device region pad 206B then transmits the signal to device pad 224B on display 222 of user device, and ground flap 204 transmits the signal to a back area of user device 210. The combination of the signal being received at the back area of user device 210 and being received on display 222 of user device 210 creates a measurable relative capacitance change which allows hardware and a software application, such as software application 116 of FIG. 1, executing on user device 210 to recognize and respond to the input.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. For example, many different types and styles of board games can be implemented utilizing concepts disclosed herein. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An interactive board for use with a plurality of game pieces and a user device having a touch screen, the interactive board comprising:
    a space for placing one of the plurality of game pieces thereon, wherein the space includes:
        a rotation code sense pad array connected to a first plurality of conductive traces connectable to the touch screen of the user device for identifying one of a plurality of rotation positions of the one of the plurality of game pieces placed in the space, by the user device;
        a ground for grounding the one of the plurality of game pieces placed in the space; and
        an identification code sense pad array connected to a second plurality of conductive traces connectable to the touch screen of the user device for identifying the one of the plurality of game pieces placed in the space, by the user device.

2. The interactive board of claim 1, wherein the rotation code sense pad array includes a discontinuous conductive trace having a plurality of segments, and wherein each of the plurality of segments is connected to one of first plurality of conductive traces.

3. The interactive board of claim 2, wherein the discontinuous conductive trace has a circular curvature.

4. The interactive board of claim 1, wherein the identification code sense pad array includes a plurality of concentric conductive traces.

5. The interactive board of claim 4, wherein the plurality of concentric conductive traces include a first circular trace surrounding a second circular trace.

6. The interactive board of claim 1, wherein each of the first plurality of conductive traces and the second plurality of conductive traces is connectable to the touch screen to generate a capacitive touch on the touch screen relative to the ground.

7. A game piece for use with an interactive board and a user device having a touch screen, the game piece comprising:
    a rotation code trace for placement in a space of the interactive board having a rotation code sense pad array connected to a first plurality of conductive traces connectable to the touch screen of the user device for identifying one of a plurality of rotation positions of the one of the plurality of game pieces placed in the space, by the user device;
    a ground for grounding the game piece when placed in the space of the interactive board having a board ground; and
    a plurality of identification code traces for placement in the space of the interactive board having a second plurality of conductive traces connectable to the touch screen of the user device for identifying the one of the plurality of game pieces placed in the space, by the user device.

8. The game piece of claim 7, wherein the rotation code trace is a discontinuous conductive trace having a plurality of segments.

9. The game piece of claim 8, wherein the discontinuous conductive trace has a circular curvature.

10. The game piece of claim 7, wherein the plurality of identification code traces include a plurality of concentric conductive traces.

11. The game piece of claim 10, wherein the plurality of concentric conductive traces include a first circular trace surrounding a second circular trace.

12. The game piece of claim 7, wherein each of the first plurality of conductive traces and the second plurality of conductive traces is connectable to the touch screen to generate a capacitive touch on the touch screen relative to the ground.

13. A game system for use with a user device having a touch screen, the game system comprising:
    a plurality of game pieces; and
    an interactive board having a space for placing one of the plurality of game pieces thereon, wherein the space includes:
        a rotation code sense pad array connected to a first plurality of conductive traces connectable to the touch screen of the user device for identifying one of a plurality of rotation positions of the one of the plurality of game pieces placed in the space, by the user device;
        a board ground for grounding the one of the plurality of game pieces placed in the space; and
        an identification code sense pad array connected to a second plurality of conductive traces connectable to the touch screen of the user device for identifying the one of the plurality of game pieces placed in the space, by the user device;
    each of the plurality of game pieces includes:
        a rotation code trace for placement in the space of the interactive board having the rotation code sense pad array;
        a game piece ground for grounding the game piece using the board ground; and
        a plurality of identification code traces for placement in the space of the interactive board having the second plurality of conductive traces.

14. The game system of claim 13, wherein the rotation code sense pad array includes a discontinuous conductive trace having a plurality of segments, and wherein each of the plurality of segments is connected to one of first plurality of conductive traces.

15. The game system of claim 14, wherein the discontinuous conductive trace has a circular curvature.

16. The game system of claim 13, wherein the identification code sense pad array includes a plurality of concentric conductive traces.

17. The game system of claim 16, wherein the plurality of concentric conductive traces include a first circular trace surrounding a second circular trace.

18. The game system of claim 13, wherein each of the first plurality of conductive traces and the second plurality of conductive traces is connectable to the touch screen to generate a capacitive touch on the touch screen relative to the ground.

19. The game system of claim 13, wherein the rotation code trace is a discontinuous conductive trace having a plurality of segments.

20. The game system of claim 19, wherein the discontinuous conductive trace has a circular curvature.

* * * * *